United States Patent [19]

Tachizawa

[11] Patent Number: 5,508,851
[45] Date of Patent: Apr. 16, 1996

[54] OBJECTIVE LENS POSTURE ADJUSTING MECHANISM FOR OPTICAL PICKUP

[75] Inventor: Hidemi Tachizawa, Fuchu, Japan

[73] Assignee: Kabushiki Kaisha Kenwood, Tokyo, Japan

[21] Appl. No.: 322,153

[22] Filed: Oct. 13, 1994

[30]   Foreign Application Priority Data

Oct. 15, 1993   [JP]   Japan ................... 5-281792

[51] Int. Cl.$^6$ ......................................... G02B 7/02
[52] U.S. Cl. ......................... 359/822; 359/813; 359/819
[58] Field of Search ........................... 359/813, 814, 359/822, 823, 824, 819; 369/44.15, 44.16

[56]             References Cited

U.S. PATENT DOCUMENTS 4,088,396   5/1978   Edelstein ..................... 359/822

FOREIGN PATENT DOCUMENTS 0341936   11/1989   European Pat. Off. .
0435647    7/1991   European Pat. Off. .
0525742    2/1993   European Pat. Off. .
0538824    4/1993   European Pat. Off. .
63-152027  11/1988  Japan .

*Primary Examiner*—Loha Ben
*Attorney, Agent, or Firm*—Sixbey, Friedman, Leedom & Ferguson; Gerald J. Ferguson, Jr.

[57]             ABSTRACT

An objective lens posture adjusting mechanism of an optical pickup capable of easily adjusting the objective lens posture. In order to adjust an inclination angle of an objective lens about two axes relative to an optical system support base, an intermediate base is superposed upon the optical system support base via first cylindrical surfaces, an object lens support base is superposed upon the intermediate base via second cylindrical surfaces having a center axis not parallel to a center axis of the first cylindrical surfaces, and the inclination angle of the objective lens about the two axes is adjusted by relative rotations of the first and second cylindrical surfaces.

5 Claims, 3 Drawing Sheets

(a)   (b)   (c)

(a)   (b)   (c)

OBJECTIVE LENS POSTURE ADJUSTING MECHANISM FOR OPTICAL PICKUP

BACKGROUND OF THE INVENTION

1. Field of the Invention

The present invention generally relates to an optical pickup of an optical disk drive, and more particularly to an optical lens posture adjusting mechanism for an optical pickup.

2. Related Background Art

An example of the structure of an optical pickup of an optical disk drive is shown in FIG. 5. Reference numeral 1 represents a laser diode which emits a laser beam. The laser beam emitted from the laser diode 1 passes through a diffraction grating 2, is reflected by a beam splitter 3, and is incident upon a collimator lens 4. The laser beam is converted into a parallel beam by the collimator lens 4, reflected by a mirror 5, and is incident upon an objective lens 6.

The laser beam incident upon the objective lens is converged on a signal recording surface of an optical disk 9. The laser beam applied to the optical disk 9 is reflected by the signal recording surface, and becomes incident upon the beam splitter 3 via the objective lens 6, mirror 5, and collimator lens 4 along the pass opposite to the incident laser beam. Most of the laser rays incident upon the beam splitter 3 transmit the beam splitter 3 and are incident upon a convex lens 7. The laser beam is converged by the convex lens 7 onto a light receiving surface of a photodiode 8 and the information recorded on the optical disk 9 is read.

In order to correctly read information by such an optical pickup, it is necessary to make the objective lens apply a laser beam to an optical disk in the direction perpendicular to the recording surface thereof and be reflected by the recording surface in the perpendicular direction, and to make the reflected laser beam be converged to the photodiode 8. To this end, the optical axis of a laser beam reflected by the objective lens is required to be coincident with the optical axis of a laser beam guiding optical system. An example of a conventional objective lens posture adjusting mechanism is shown in FIG. 4. Reference numeral 10 represents an optical system support base which supports an optical system excepting an objective lens. An objective lens support base 11 is mounted with a printed circuit board 13 by screws. The printed circuit board 13 resiliently supports a lens holder 6a by means of four resilient members 14.

Two pairs of confronting yokes 11b and 11c are mounted on the objective lens support base 11. Magnets 12 are mounted on the yokes 11c. The objective lens 6 is secured to the lens holder 6a, and the yokes 11b are inserted into holes formed in the lens holder 6a. A tracking coil and a focussing coil for interacting with a magnetic field generated by the yokes and magnets are secured to the lens holder 6a.

A spherical convex 11a is formed at the objective lens support base 11, and a spherical concave 10a in surface contact with the spherical convex 11a is formed at the optical system support base 10. The objective lens support base 11 is aligned with the optical system support base 10 by making the spherical convex 11a in surface contact with the spherical concave 10a, and held in position by screws 17 and 15.

As specifically shown in FIG. 5, the screws 17 are inserted into washers and holes formed in the optical system support base 10, and threaded into tapped holes formed in the objective lens support base 11. In the above manner, the objective lens support base 11 is attracted toward the optical system support base 10 by the force of the coil spring 16, and the spherical convex 11a is maintained in tight contact with the spherical concave 10a.

By adjusting the threading amount of two screws 17, the rotary angle of the objective lens 6 about the X- and Y-axes shown in FIG. 4 is controlled. A laser beam entering the objective lens 6 passes through holes formed in the spherical convex 11a and concave 10a at the centers thereof.

The above-described object lens posture adjusting mechanism of an optical pickup adjusts the rotary angle of the objective lens about the X- and Y-axes by using two screws. However, adjustment is not easy because the objective lens rotates about both the X- and Y- axes even if one of the screws is rotated.

Furthermore, the spherical convex 11a is formed on the central bottom surface of the objective lens support base 11, so that it is difficult to observe the contact conditions of the surfaces of the spherical convex 11a and concave 10a. If a surface contact is not perfect, a sufficient contact force at the bonded surfaces after the adjustment cannot be ensured. Also, there is a problem that adhesive agent is difficult to be applied to the whole contact surfaces.

Still further, space for the mirror is not available because the hole formed in the spherical convex 11a is circular. Therefore, the mirror is required to mount under the spherical convex, thickening the optical pickup.

SUMMARY OF THE INVENTION

The invention has been made under such circumstances, and it is an object of the present invention to provide an objective lens posture adjusting mechanism of an optical pickup capable of eliminating the influence of adjustment at least about one axis upon the rotary angle about the other axis.

It is another object of the present invention to provide an objective lens posture adjusting mechanism of an optical pickup easy to observe a surface contact state and apply adhesive agent to the surface contact area after the adjustment.

It is a further object of the present invention to provide an object lens posture adjusting mechanism capable of thinning an optical pickup by forming a rectangular hole at the surface contact area and disposing a mirror in the hole.

According to one aspect of the present invention, there is provided an objective lens posture adjusting mechanism of an optical pickup for adjusting an inclination angle of an objective lens about two axes relative to an optical system support base, wherein an intermediate base is superposed upon the optical system support base via first cylindrical surfaces, an object lens support base is superposed upon the intermediate base via second cylindrical surfaces having a center axis not parallel to a center axis of the first cylindrical surfaces, and the inclination angle of the objective lens about the two axes is adjusted by relative rotations of the first and second cylindrical surfaces.

According to another aspect of the present invention, the center of the objective lens is made flush with the center axes of the first and second cylindrical surfaces.

According to a further aspect of the invention, two tapped holes and one loose hole are formed in the intermediate base at positions not extending on one straight line, a tapped hole is formed in the objective lens support base at the position corresponding to the loose hole, two screws are threaded into the two tapped holes via two holes formed in the optical system support base at the positions corresponding to the two tapped holes, one screw is threaded into the one tapped hole of the objective lens support base via a spring and a hole formed in the optical system support base at the position corresponding to the loose hole of the intermediate base, the intermediate base and the objective lend support base superposed via the second cylindrical surfaces are biased by a spring at the position opposite to the tapped hole of the objective lens support base so as to make the intermediate base and the objective lens support base come near each other, and the inclination angle of the object lens about the two axes is adjusted by rotating each of the three screws.

According to the object lens posture adjusting mechanism of an optical pickup, the intermediate base is fixed to the optical system support base, and without moving the intermediate base, the inclination angle about only one axis can be adjusted by relative rotations of the first cylindrical contact surfaces between the intermediate base and the objective lens support base.

Furthermore, since the center of the objective lens is made flush with the center axes of the first and second cylindrical contact surfaces, the height of the objective lens will not change during adjustment, and the posture adjustment will not result in an off-focus state.

DETAILED DESCRIPTION OF THE PREFERRED EMBODIMENTS

Figure 1:
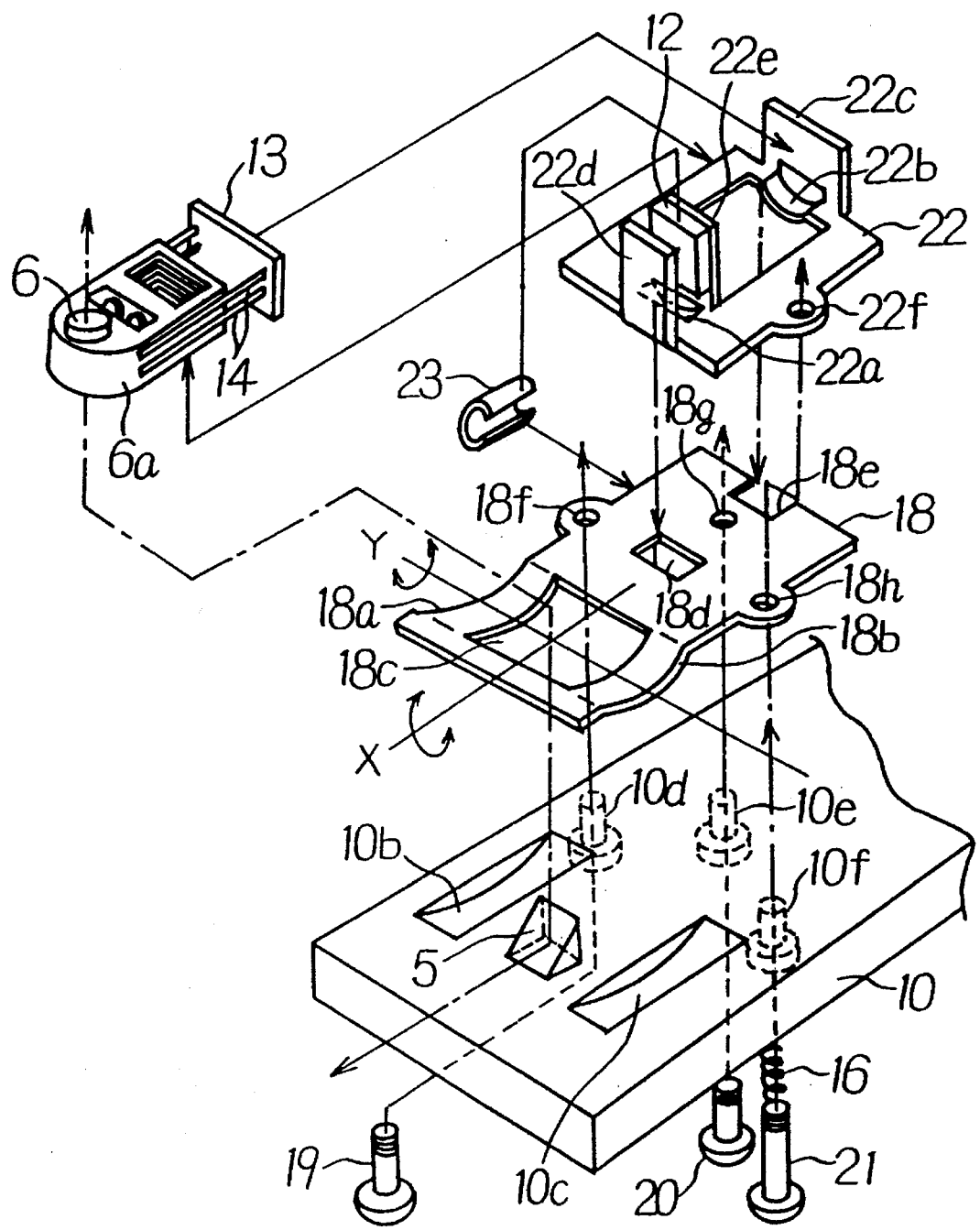
FIG. 1 is a broken perspective view showing the main part of an objective lens posture adjusting mechanism of an optical pickup according to an embodiment of the present invention.
Figure 2:
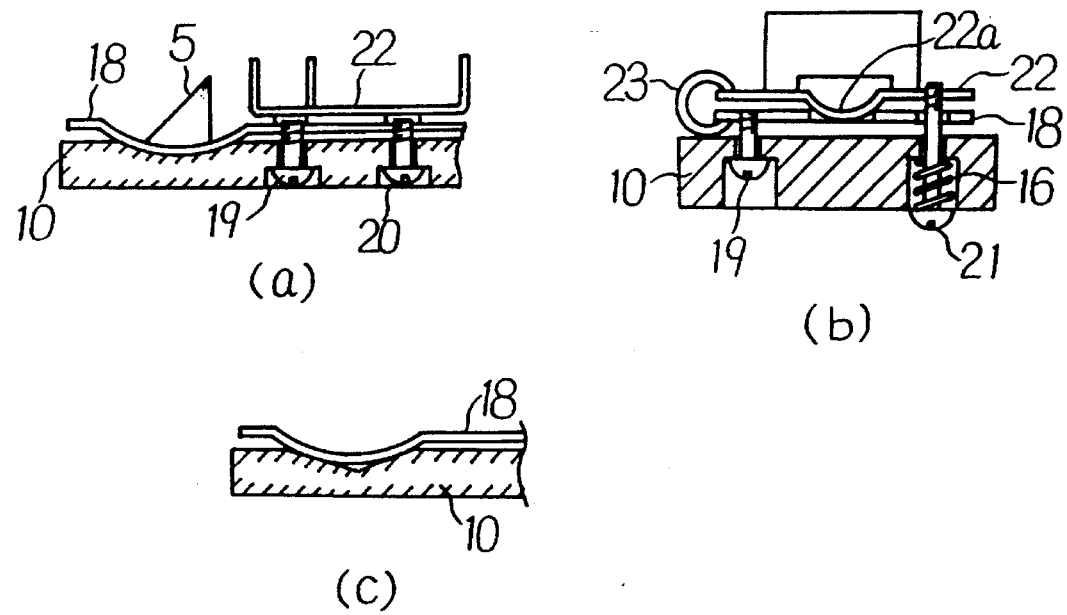
FIG. 2A is an elevational cross sectional view of the objective lens posture adjusting mechanism taken along a bent line.
FIG. 2B is a traverse cross sectional view of the objective lens posture adjusting mechanism.
FIG. 2C is a partial cross sectional view showing a modification of the objective lens posture adjusting mechanism.
Figure 3:
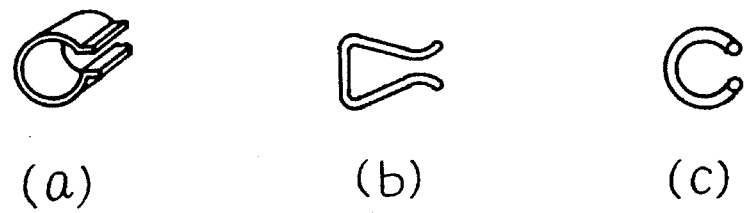
FIGS. 3A, 3B and 3C are perspective views showing modifications of a C-shaped spring used by the objective lens posture adjusting mechanism.
Figure 4:
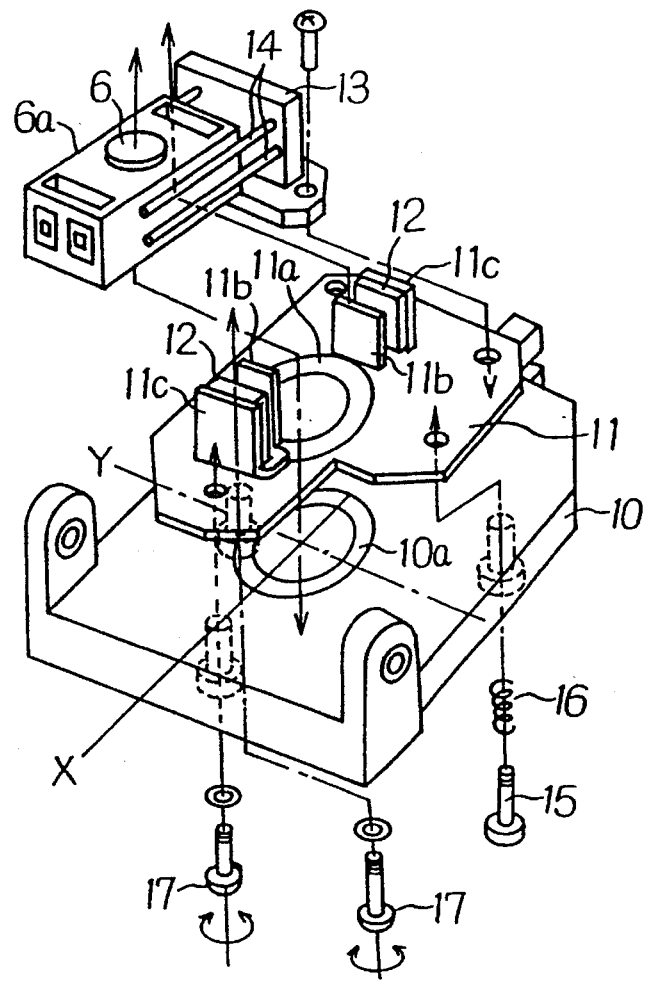
FIG. 4 is a broken perspective view showing an example of a conventional objective lens posture adjusting mechanism of an optical pickup.

An objective lens posture adjustment mechanism of an optical pickup according to an embodiment of the invention will be described with reference to FIGS. 1 to 3. In FIGS. 1 to 3, elements having the same functions as a conventional mechanism are represented by using identical reference numerals, and the description thereof is omitted.

Referring to FIG. 1, reference numeral 18 represents an intermediate base having striped cylindrical convexes 18a and 18b between which a rectangular hole 18c is provided. Striped cylindrical concaves 10b and 10c in surface contact with the striped cylindrical convexes 18a and 18b are formed at an optical system support base 10. A mirror 5 is mounted on the optical system support base 10 between the striped cylindrical concaves 10b and 10c.

Other striped cylindrical convexes 22a and 22b are formed at an objective lens support base 22. A rectangular hole 18d and a recess 18e are formed in the intermediate base 18 which are in line contact with the striped cylindrical convexes 22a and 22b. The objective lens support base 22 is formed with a bent piece 22c on which a printed circuit board 13 is mounted and yokes 22d and 22e formed by bending and cutting/folding.

The printed circuit board 13 resiliently supports a lens holder 6a by four resilient members 14. A magnet 12 is mounted on the yoke 22e. An objective lens 6 is secured to the lens holder 6a, and the yokes 22d and 22e and magnet 12 are inserted into a hole formed in the lens holder 6a. A tracking coil and a focussing coil for interacting with a magnetic field generated by the yokes and magnet are secured to the lens holder 6a.

The optical system support base 10 and intermediate base 18, and the intermediate base 18 and objective lens support base 22 are coupled by screws 19, 20, and 21. The screw 19 is threaded via a flanged hole 10d formed in the optical system support base 10 into a tapped hole 18f formed in the intermediate base 18. The screw 20 is threaded via a flanged hole 10e formed in the optical system support base 10 into a tapped hole 18g formed in the intermediate base 18. The screw 21 is inserted into a coil spring 16, a stepped hole 10f of the optical system support base 10, and a stepped hole 18h of the intermediate base 18, and threaded into a tapped hole 22f formed in the objective lens support base 22. The intermediate base 18 and objective lens support base 22 are coupled together by a C-shaped spring 23 at the right side thereof so as to make both the bases 18 and 22 come near each other.

Figure 5:
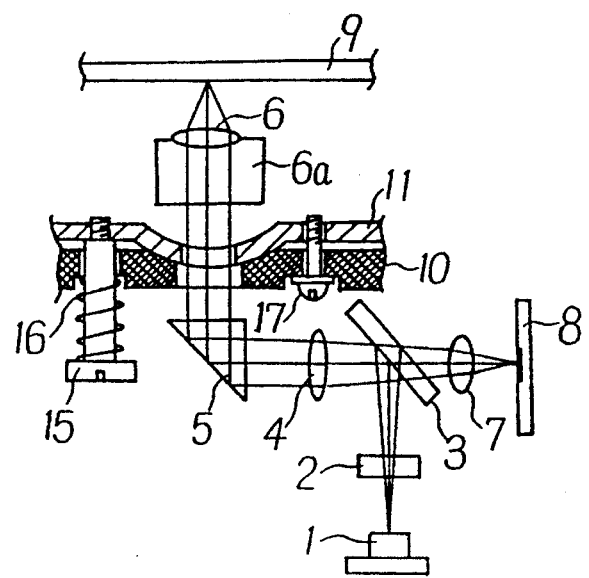
FIG. 5 is a diagram illustrating an optical path of an optical pickup.

The intermediate base 18 and objective lens support base 22 are mounted on the optical system support base 10 by the screw in the manner described above, and a laser beam passing through the objective lens 6 is reflected by the mirror 5 and guided to the optical system such as shown in FIG. 5.

The posture of the objective lens 6 is adjusted by the screws 19, 20, and 21 by adjusting the rotary angle of cylindrical contact surfaces between the optical system support base 10 and intermediate base 18 and between the intermediate base 18 and the objective lens support base 22.

As shown in FIG. 2A, the heights of the tapped hole of the intermediate base 18 into which the screws 19 and 20 are threaded change with the rotary angle of the intermediate base 18 about the cylindrical contact surfaces. Therefore, the rotary angle can be adjusted by adjusting the threading amount of the screws 19 and 20. The cylindrical contact surfaces can be maintained wholly in a contact state by setting the rotation angle ratio of the screws 19 and 20 to a proper value.

As shown in FIG. 2B, the objective lens support base 22 is applied with resilient forces of the C-shaped spring 23 and the coil spring 16 at the right and left sides of the base 22. Specifically, the C-shaped spring 23 biases the objective lens support base 22 in the counter clockwise direction about the line contact area of the striped convexes 22a and 22b, whereas the coil spring 16 fitted around the screw 21 biases the objective lens support base 22 in the clockwise direction about the line contact area of the striped convexes 22a and 22b. The rotary angle of the objective lens support base 22 about the line contact area can be therefore adjusted by changing the resilient force of the coil spring 16 by adjusting the rotation amount of the screw 21.

Because the central axes of the cylindrical contact members of the intermediate base 18 and objective lens support base 22 are aligned with the center of the objective lens 6, the height of the objective lens 6 will not change and its focal point will not be shifted even if the posture of the objective lens 6 is adjusted by adjusting the rotary angles about the cylindrical contact areas and lines.

The resilient force of the coil spring 16 attracts the objective lens support base 22 and intermediate base 18 toward the optical system support base 10 to tightly contact the cylindrical convexes with the cylindrical concaves and the end lines of the rectangular hole. However, in this condition, the whole of the tight contact areas or lines can be observed from both the sides of areas or lines. It is therefore easy to maintain the cylindrical contact areas or lines in a perfect contact state. With a good contact state, the bonding force of adhesive agent applied after the adjustment can be increased.

A modification of the optical system support base 10 is shown in FIG. 2C. In this example, the cylindrical convex of the intermediate base 18 is supported by a wedge-like hollow formed in the optical system support base 10. Instead of the wedge-like hollow, a rectangular groove may be formed to support the cylindrical convex of the intermediate base 18.

Modifications of the C-shaped spring usable by the embodiment objective lens posture adjusting mechanism are shown in FIG. 3. A spring indicated at (a) in FIG. 3 is formed by a plate spring like the embodiment. However, the opposite ends are bent. A spring indicated at (b) in FIG. 3 is formed by a wire spring bent in generally a channel shape. A spring indicated at (c) is formed by a wire spring bend circularly. As the material of these springs, a material having an elasticity may be used, such as metal, synthetic resin, and rubber.

According to the objective lens posture adjusting mechanism of an optical pickup of the invention, the whole of the tight contact areas or lines can be observed from both the sides of areas or lines. It is therefore easy to maintain the cylindrical contact areas or lines in a perfect contact state. With a good contact state, the bonding force of adhesive agent applied after the adjustment can be increased. Adhesive agent is easy to be coated from both the sides of areas or lines.

Furthermore, the rotary angle at least about one cylindrical contact areas or lines can be adjusted independently so that the posture of an objective lens can be easily adjusted.

Still further, a mirror can be mounted in the rectangular hole formed between the cylindrical convexes so that the optical pickup can be thinned. A cylindrical plane can be worked easier than a spherical plane, providing a high precision component.

What is claimed is:

1. An objective lens posture adjusting mechanism of an optical pickup provided with an objective lens for adjusting an inclination angle of the objective lens about two different direction first and second axes relative to an optical system support base (10), the mechanism including a pickup hold base (22) for holding the pickup and an intermediate base (18) interposed between said optical system support base and said pickup base, wherein a first cylindrical projection (22a, 22b) with a center axis (X), of the first axis direction is formed on one of said pickup hold base or said intermediate base, a first reception (18d, 18e) which receives said first cylindrical projection in a mechanical contact is formed on the other of said pickup hold base or said intermediate base, and said pickup hold base and said intermediate base are mechanically coupled so that said first cylindrical projection and said first reception are relatively slidable for a rotation of said pickup hold base about the center axis of the first axis direction at said mechanical contact thereof, and a second cylindrical projection (18a, 18b) with a center axis (Y) of the second axis direction is formed on one of said intermediate base or said optical system support base, a second reception (10b, 10c) which receives said second cylindrical projection in a mechanical contact is formed on the other of said intermediate base or said optical system support base, and said intermediate base and said optical system support base are mechanically coupled so that said second cylindrical projection and said second reception are relatively slidable for a rotation of said intermediate base about the center axis of the second axis direction at said mechanical contact thereof.

2. An objective lens posture adjusting mechanism according to claim 1 including first adjustment means (21, 16) for rotating said pickup hold base about the center axis of the first axis direction, and second adjustment means (19, 20) for rotating said intermediate base about the center axis of the second axis direction.

3. An objective lens posture adjusting mechanism according to claim 2 wherein after adjusting the positions of said pickup hold base and said intermediate base, the mechanical contact between the first cylindrical projection and the first reception and the mechanical contact between the second cylindrical projection and the second reception are fixed by adhesive agent.

4. An objective lens posture adjusting mechanism according to claim 1 wherein said first and second axes pass through the center of the objective lens.

5. An objective lens posture adjusting mechanism according to claim 1 wherein a mirror for reflecting a light beam into and from the objective lens is mounted on the optical system support base.

\* \* \* \* \*